(12) United States Patent
Jagannath et al.

(10) Patent No.: US 9,794,155 B2
(45) Date of Patent: Oct. 17, 2017

(54) SYSTEM AND METHOD FOR COORDINATING CLIENT-SIDE INFERENCE OF MOBILE NETWORK LOADING AND CAPACITY

(71) Applicants: Shantigram Jagannath, Bangalore (IN); Minyan Shi, Bolton, MA (US); Carlee Joe-Wong, Princeton, NJ (US); Sangtae Ha, Boulder, CO (US)

(72) Inventors: Shantigram Jagannath, Bangalore (IN); Minyan Shi, Bolton, MA (US); Carlee Joe-Wong, Princeton, NJ (US); Sangtae Ha, Boulder, CO (US)

(73) Assignee: TUBE INCORPORATED, Chelmsford, MA (US)

(*) Notice: Subject to any disclaimer, the term of this patent is extended or adjusted under 35 U.S.C. 154(b) by 113 days.

(21) Appl. No.: 14/976,896

(22) Filed: Dec. 21, 2015

(65) Prior Publication Data
US 2016/0197813 A1 Jul. 7, 2016

Related U.S. Application Data

(60) Provisional application No. 62/094,493, filed on Dec. 19, 2014.

(51) Int. Cl.
| | |
|---|---|
| *H04L 12/26* | (2006.01) |
| *H04L 12/24* | (2006.01) |
| *H04W 4/18* | (2009.01) |

(52) U.S. Cl.
CPC ............ *H04L 43/12* (2013.01); *H04L 41/046* (2013.01); *H04L 41/0806* (2013.01);
(Continued)

(58) Field of Classification Search
CPC ............... H04L 41/046; H04L 41/0806; H04L 43/0829; H04L 43/0864; H04L 43/087; H04L 43/0888; H04L 43/12; H04L 4/18
See application file for complete search history.

(56) References Cited

U.S. PATENT DOCUMENTS

| | | | | |
|---|---|---|---|---|
| 2006/0234638 A1* | 10/2006 | Mueckenheim | ....... | H04B 17/20 455/67.11 |
| 2007/0083633 A1* | 4/2007 | Roth | ................... | G06F 11/3688 709/223 |

(Continued)

*Primary Examiner* — Khaled Kassim
(74) *Attorney, Agent, or Firm* — Meagher Emanuel Laks Goldberg & Liao, LLP (57) ABSTRACT

A data communication system configured to determine and coordinate loading in a mobile network with plurality of client devices. The system includes a control server coupled the client devices. The control server has a probe control function that transmits a downlink (DL) probe with an updated client probing profile to each client device. The client device has a client probing control engine that gathers network measurement information for transmission to the control server and generates uplink (UL) probes containing the network measurement information including, radio access network (RAN) metrics, DL probe measurements for transmission to the control server based on the client probing profile. The control server receives the UL probes from the client devices and determines the system load based on the measurement information, the control server updates client scheduling information based on the system load and transmits the client scheduling information to the plurality of client devices.

28 Claims, 3 Drawing Sheets

(52) U.S. Cl.
CPC ........ *H04L 43/087* (2013.01); *H04L 43/0829* (2013.01); *H04L 43/0864* (2013.01); *H04L 43/0888* (2013.01); *H04W 4/18* (2013.01)

(56) References Cited

U.S. PATENT DOCUMENTS

| | | | |
|---|---|---|---|
| 2012/0030341 A1* | 2/2012 | Jensen | H04L 67/2804 709/224 |
| 2012/0284712 A1* | 11/2012 | Nimmagadda | G06F 9/5077 718/1 |
| 2014/0128073 A1* | 5/2014 | Farhadi | H04W 16/14 455/436 |
| 2014/0136482 A1* | 5/2014 | Rochette | G06F 17/30575 707/634 |
| 2014/0148165 A1* | 5/2014 | Serravalle | H04W 16/14 455/436 |
| 2014/0215076 A1* | 7/2014 | Grothues | G06F 9/455 709/226 |
| 2015/0085746 A1* | 3/2015 | Somayazulu | H04W 48/08 370/328 |
| 2015/0103657 A1* | 4/2015 | Henderson | H04W 36/0083 370/232 |
| 2016/0056629 A1* | 2/2016 | Baker | G05B 15/02 700/276 |
| 2016/0197813 A1* | 7/2016 | Jagannath | H04L 41/046 370/252 |
| 2017/0041936 A1* | 2/2017 | Tarlazzi | H04B 17/318 |

\* cited by examiner

SYSTEM AND METHOD FOR COORDINATING CLIENT-SIDE INFERENCE OF MOBILE NETWORK LOADING AND CAPACITY

CROSS-REFERENCE TO PRIOR FILED APPLICATIONS

This application claims the benefit of U.S. Provisional Application No. 62/094,493 filed Dec. 19, 2014, which is incorporated herein in its entirety.

TECHNICAL FIELD

This invention relates generally to systems and methods for detecting states of wireless network. It is a type of measurement, analysis, and data-driven method in communication systems and networks.

BACKGROUND

This disclosure pertains to the inference of available network loading and capacity and loading in wireless networks, including cellular networks in 2G, 3G, 4G and the like.

It is useful to know network states, including channel and loading conditions in a given sector of a cellular network. Such information helps network operators and content providers using the network know the currently available network capacity and self-correct the usage, as well as predict the future conditions and accordingly provision capacity in different sectors of their network. It will also give insights into the quality experienced by users in different network sectors, which yields information about customer satisfaction that is useful to both network operators and online content providers, as well as the users themselves. Moreover, the knowledge of the network can help diagnose the causes of self-reported customer dissatisfaction.

It is difficult to know those states purely from network side. While the network side base stations have access to information pertaining to the channel conditions as well as the load, there are no means to bring this information out in a secure and scalable manner such that it can be collected, analyzed and useful for the content providers and subscribers. Moreover, for the information to be useful for the content providers and subscribers it will have to be collected and collated across all operators and over their many different types of vendor equipment Disadvantages of network side measurements include: (1) non-real-time, (b) costly, (d) dependent on operators and vendors' variations. Improved systems and methods for determining and managing client-side inference of mobile network conditions are desirable.

SUMMARY OF THE INVENTION

Disclosed herein is a data communication system configured to determine the system loading in a mobile network. The system includes a control server coupled to one or more client devices, e.g., mobile devices. The system includes a client probing profile including the timing and sizing of a sequence of a given number of probe packets sent by each of the client devices to the control server, where each probe packet is sent at a certain time, with a certain number of bytes.

Each of the multiple clients establishes a signaling pathway with the control server that is for example situated in the cloud. Clock synchronization is first carried out once a new client arriving at a sector establishes the signaling pathway. Channel quality may also be reported, including SNR values as seen by each client. Downlink control goes from the server to each client to coordinate the timing and sizing of probes. Uplink control goes from each client to the server to report, on a periodic basis, the results. In addition, there are also the downlink data paths and uplink data paths between the control server and the clients, where the actual probe packets traverse.

For downlink data paths, the control signaling is minimal: the control server (1) optimizes the tradeoff between inference accuracy and probing sizes and (2) distribute the downlink probes, evenly or unevenly, toward the clients. Then the probes are sent on the downlink data paths. For uplink data paths, the control server (1) optimizes the tradeoff between inference accuracy and probing sizes, (2) optimizes the starting time and the probing profile for each client, and (3) send the control messages to each client, requesting the clients to send probing packets on the uplink data paths, starting at a certain time and a certain probing profile. Then, upon receiving such control messages, each client sends the probes accordingly.

The measurement information collected by each client includes delay measurement and its statistics, packet loss inference, and throughput measurement, are reported back to the control server using the uplink signaling pathway. Finally, the control server, upon receiving the measurement data collected by the clients, fuse the data together to create statistical inference of system load.

In more detail, a data communication system configured to determine and coordinate loading in a mobile network is disclosed. The system operates with a plurality of client devices each configured with a processor. The system includes a control server configured with a processor coupled to a plurality of the client devices, the control server being equipped with a probe control function configured to transmit a downlink (DL) probe with an updated client probing profile to each client device. Each client device processor is configured with a client probing control engine configured to gather network measurement information for transmission to the control server and generate uplink (UL) probes containing the network measurement information including, radio access network (RAN) metrics, DL probe measurements for transmission to the control server based on the client probing profile. The control server is configured to receive the UL probes from the client devices and determine the system load based on the measurement information, the control server being configured to update client scheduling information based on the system load and transmit the client scheduling information to the plurality of client devices.

Each client device may include an adaptive upload/download client configured to upload or download application data during a system valley based on the client scheduling information. Each client device may include a DL probe process configured to generate the DL probe measurements, the DL probe process being configured to receive DL probe packets from the control server and record the packet delay, delay jitter and packet loss. Each client device may include an UL probe generator configured to control a number of UL probe packet to send, length of each packet, interval between each packet and a frequency of UL probing based on the client probing profile. Each client device may have a default client probing profile with initial configuration information prior to receiving an updated client probing profile from the control server.

Each client device may include a Radio Access Network (RAN) metrics reader configured to collect the RAN metrics including, device type, remaining battery, RAN type, RAN signal strength, RAN signal quality and cell identification (ID). Each client device may include an apps metrics reader configured to collect apps metrics including application average throughput and application round trip delay. Each client device may include an aggregator configured to generate UL probes including a time stamp and RAN metrics. The aggregator may be configured to generate UL probes including app metrics. The aggregator may be configured to generate UL probes including DL probe measurements.

The control server may include a pre-processor configured to receive the UL probes and unpack the time stamp and RAN metrics, app metrics and DL probe measurements. The pre-processor may be configured to normalize the RAN, application and DL probe measurements, compute the mean and standard deviation and remove highly correlated measurements. The pre-processor may be configured to receive the UL probes and calculates the UL delay, delay jitter and packet loss. The control server may include a load calculation engine configured to select and to run a load calculation algorithm based on the UL probes. The load calculation engine may be configured to calculate system load based on device measurements and historical data from the UL probes. The load calculation engine may include pre-trained neural network algorithms that receive preprocessed device measurements and historical data as inputs and estimate the average number of users, cell UL/DL radio resource usage and UL/DL throughputs for the near future and a network load peak/valley indicator. The load calculation engine may be coupled to a database configured to store historical information including capacity usage estimates, network load peak/valley indicator and valley duration and an associated timestamp.

The system may include a server probe controller configured to determine which of the plurality of mobile devices in a sector should send or receive probes and how often. The server probe controller may be configured to rank the mobile devices in a sector by data usage, remaining battery, RF condition, and determine the client probing profile for each device. The client probing profile may include an individual ON/OFF flag for RAN metrics measurement, app metrics measurement, DL probe metrics measurements, and UL probing.

A data communication method to determine and coordinate loading in a mobile network is also disclosed. The method is implemented in a data communication system with a plurality of client devices each configured with a processor. A control server configured with a processor is coupled to a plurality of the client devices, the control server being equipped with a probe control function configured to transmit a downlink (DL) probe with an updated client probing profile to each client device. Each client device processor is configured with a client probing control engine configured to gather network measurement information for transmission to the control server and generate uplink (UL) probes containing the network measurement information including, radio access network (RAN) metrics, DL probe measurements for transmission to the control server based on the client probing profile. The control server is configured to receive the UL probes from the client devices and determine the system load based on the measurement information, the control server being configured to update client scheduling information based on the system load and transmit the client scheduling information to the plurality of client devices.

Each client device may include an adaptive upload/download client configured to upload or download application data during a system valley based on the client scheduling information. Each client device may include a DL probe process configured to generate the DL probe measurements, the DL probe process being configured to receive DL probe packets from the control server and record the packet delay, delay jitter and packet loss. Each client device may include an UL probe generator configured to control a number of UL probe packet to send, length of each packet, interval between each packet and a frequency of UL probing based on the client probing profile. Each client device may have a default client probing profile with initial configuration information prior to receiving an updated client probing profile from the control server.

Each client device may include a Radio Access Network (RAN) metrics reader configured to collect the RAN metrics including, device type, remaining battery, RAN type, RAN signal strength, RAN signal quality and cell identification (ID). Each client device may include an apps metrics reader configured to collect apps metrics including application average throughput and application round trip delay. Each client device may include an aggregator configured to generate UL probes including a time stamp and RAN metrics. The aggregator may be configured to generate UL probes including app metrics. The aggregator may be configured to generate UL probes including DL probe measurements.

The control server may include a pre-processor configured to receive the UL probes and unpack the time stamp and RAN metrics, app metrics and DL probe measurements. The pre-processor may be configured to normalize the RAN, application and DL probe measurements, compute the mean and standard deviation and remove highly correlated measurements. The pre-processor may be configured to receive the UL probes and calculates the UL delay, delay jitter and packet loss. The control server may include a load calculation engine configured to select and to run a load calculation algorithm based on the UL probes. The load calculation engine may be configured to calculate system load based on device measurements and historical data from the UL probes. The load calculation engine may include pre-trained neural network algorithms that receive preprocessed device measurements and historical data as inputs and estimate the average number of users, cell UL/DL radio resource usage and UL/DL throughputs for the near future and a network load peak/valley indicator. The load calculation engine may be coupled to a database configured to store historical information including capacity usage estimates, network load peak/valley indicator and valley duration and an associated timestamp.

A server probe controller configured may be provided to determine which of the plurality of mobile devices in a sector should send or receive probes and how often. The server probe controller may be configured to rank the mobile devices in a sector by data usage, remaining battery, RF condition, and determine the client probing profile for each device. The client probing profile may include an individual ON/OFF flag for RAN metrics measurement, app metrics measurement, DL probe metrics measurements, and UL probing.

DETAILED DESCRIPTION

It is possible and advantageous to infer network states, including channel and loading conditions in a given sector of a cellular network from client devices, such clients include phones, tablets, laptops, game consoles, etc. Client devices are well integrated with content providers through the applications and are also constantly aware of the subscriber usage/location patterns. Such information can be made available to the consumers of that information in real-time, for example if there is a lot of available capacity in the network the content provider can choose to use it for the advantage of the user experience and at much lower cost to the operator.

In the wireless network the channel conditions are constantly changing and play a significant role in the experience as seen by the subscribers—any algorithms that have to measure the current available capacity and predict the available capacity in the future must account for the channel and the load conditions. A system that conducts measurements on the client side, crowd-sourcing across large numbers of clients and uses analytics to consolidate the information for a per-sector analysis of the available capacity is new compared to the state of the art.

In a given sector of mobile wireless network, a plurality of clients equipped with active probing and load inference capability may be used. The clients can communicate with a central control server through signaling paths and thus be coordinated in the optimization of probing, including the timing and sizing of the probes.

There are three main reasons why leveraging a crowd of clients is useful: (1) Robustness of availability: due to mobility, certain clients may not be ready to send probes, and having multiple clients reduces the chance that no probes can be sent in a whole sector.

(2) Robustness of accuracy: some clients will have better signal quality than others in a sector due to the geographic locations relative to the base station or propagation environment, and generally that leads to more accurate inference of loading. Furthermore, combining multiple probing results in general makes the final inference more accurate.

(3) Reduction of probe size: as the number of clients increases, each client needs to send fewer probes, or use fewer packets per probe. This in turn reduces the data consumption for network state inference purpose by each client.

In general, a method that leverages the plurality of clients in a given sector leads to a "self-scaling" property: as the network load increases, there may also be more clients available to infer the network load.

Figure 1A:
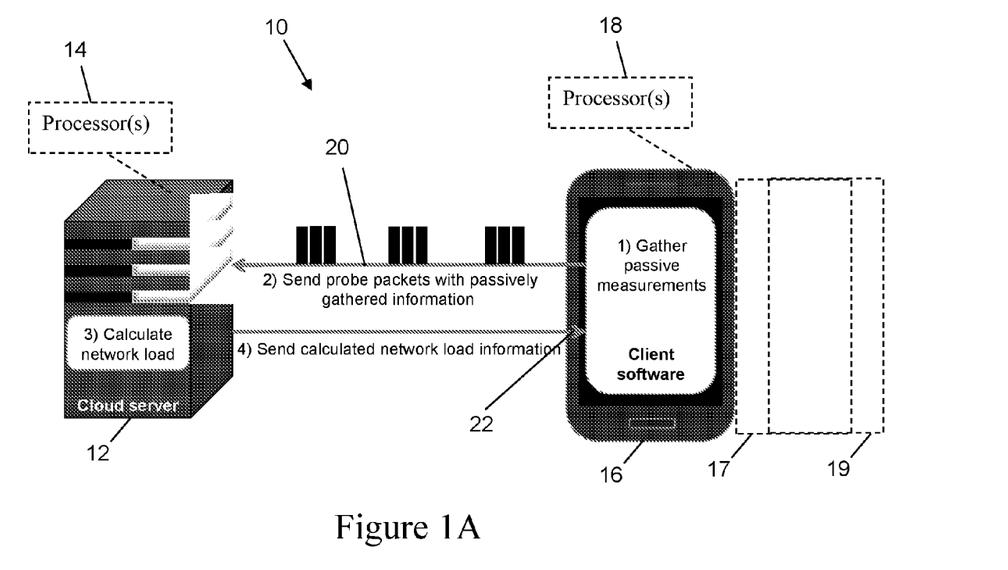
FIG. 1A is a block diagram showing a system configured to determine and coordinate client-side inference in a mobile network.

FIG. 1A is a block diagram showing a data communication system 10 configured to determine and coordinate the system loading in a mobile network. The system 10 includes a control server 12 coupled to one or more client devices 16, e.g., mobile devices. The control server 12 is coupled to a data network such as the cloud. The control server 12 is configured with one or more processors as shown by block 14 as is well known in the art. The client device 16 is also configured with one or more processors as shown by block 18 as is well known in the art. In general, the processor 18 in the client device 16 gathers network measurement information for transmission to the control server 12. The network measurement information (passive measurements) generally includes device and RAN information, delay measurements and statistics, packet loss inference, and throughput measurements. The network measurement measurements are reported back to the control server 12 using an uplink signaling pathway as shown generally by reference number 20.

It should be understood that multiple client devices may establish a signaling pathway with the control server 12. The control server 12 receives the network measurement information from the multiple client devices 16, 17, 19. Downlink control goes from the server to each client to coordinate the timing and sizing of probes. Uplink control goes from each client to the server to report, on a periodic basis, the results. In addition, there are also the downlink data paths and uplink data paths between the control server and the clients, where the actual probe packets traverse. For downlink data paths, the control signaling is minimal: the control server 12 (1) optimizes the tradeoff between inference accuracy and probing sizes and (2) distributes the downlink probes, evenly or unevenly, toward the clients. Then the probes are sent on the downlink data paths.

Figure 1B:
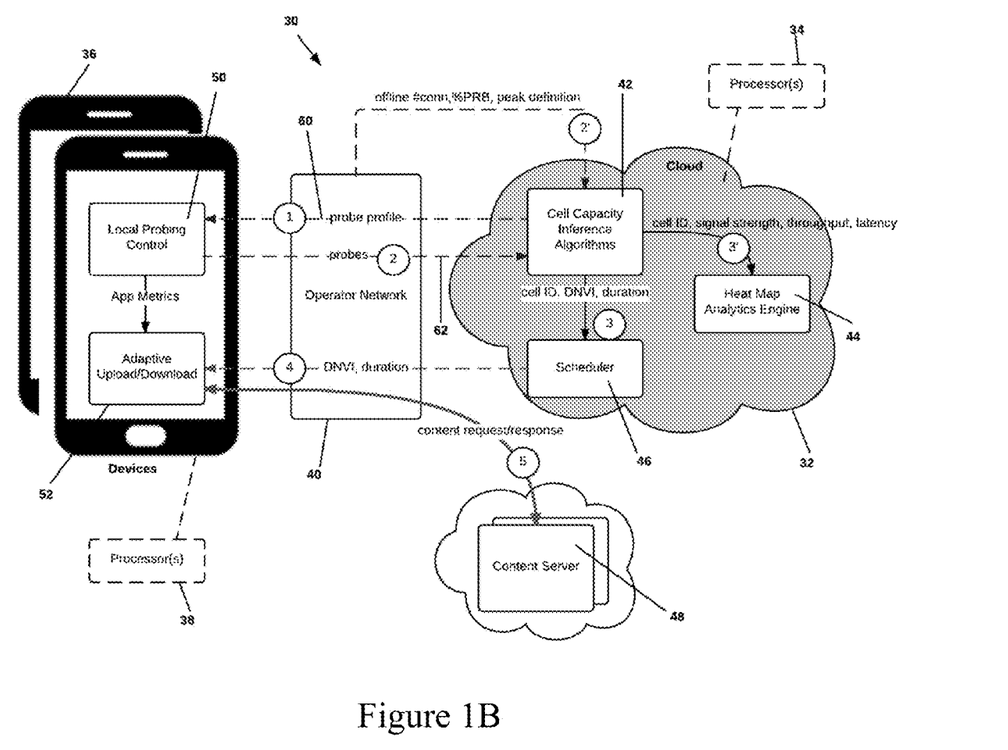
FIG. 1B is a more detailed block diagram showing a data communication system configured to determine and coordinate client-side inference in a mobile network.

FIG. 1B is a more detailed block diagram showing a data communication system 30 configured to determine and coordinate client-side inference in a mobile network. The system 30 includes a control server 32 coupled to one or more client devices 36, e.g., mobile devices. The control server 32 may be implemented in the cloud as shown and may include one or more processors 34 as is well known in the art. The control server 32 is coupled to a data network or operator network shown generally by reference number 40. The client device 36 is also configured with one or more processors as shown by block 38 as is well known in the art. In general, the processor 38 in the client device 36 is configured with a client probing control engine 50 configured to gather network measurement information for transmission to the control server 32. The network measurement information (passive measurements) generally includes 1) device and RAN metrics; 2) application metrics; 3) DL probing measurements, such as, DL delay and delay jitter, downlink (DL) probe packet loss; and 4) uplink (UL) probes. The network measurement measurements are reported back to the control server 32 using an uplink signaling pathway as shown generally by reference number 62.

The processor 38 in the client device 36 is also configured with an adaptive upload/download client 52 configured to receive a sector capacity usage peak/valley indicator (DNVI—DataMi Network Valley Indicator) from the load calculation engine 98 (FIG. 2) and the peak/valley duration for the sector that the device resides in, and to request (or send) the contents on behalf of an mobile application at the sector capacity usage valley whenever possible. For example, the upload/download client 52 may request a large block of data, e.g., video data, during a network valley. The upload/download client 52 may also delay downloading additional data until the next network valley (so long as the requesting application can tolerate the delay). Using this approach, the mobile device 36 uses network capacity more efficiently, helps to reduce the network congestion, and improves the user experience of all mobile users sharing the same sector.

The control server 32 generally incudes a cell capacity engine 42, a heat map analytics engine 44 and a scheduler 46. The cell capacity engine 42 includes a probe controller (see e.g., reference number 92 in FIG. 2), a network measurement pre-processor (see e.g., reference number 94 in FIG. 2), a load calculation algorithm selector and multiple load calculation algorithms (see e.g., reference number 98 in FIG. 2). The probe controller decides which mobile devices in a sector should probe and how often. The pre-processor prepares the received probe data 62 before feeding the data to a load calculation algorithm. The algorithm selector decides which load calculation algorithm to use based on the type of measurements available in the network measurement.

The load calculation algorithms estimate the sector capacity usage (e.g. average number of user, downlink and uplink radio resource usage, downlink and uplink throughput) in near future, derives the DNVI and its duration, and sends the results to heat map analytics engine 44 and the scheduler 46. See also U.S. Patent App. No. 61/917,442 filed on Dec. 18, 2013 entitled "A System and Method for Scheduling Mobile Data During Spectrum Valley" which is incorporated herein in its entirety. It should be understood that a variety of load calculation algorithms may be used without departing from the scope of this disclosure.

Figure 2:
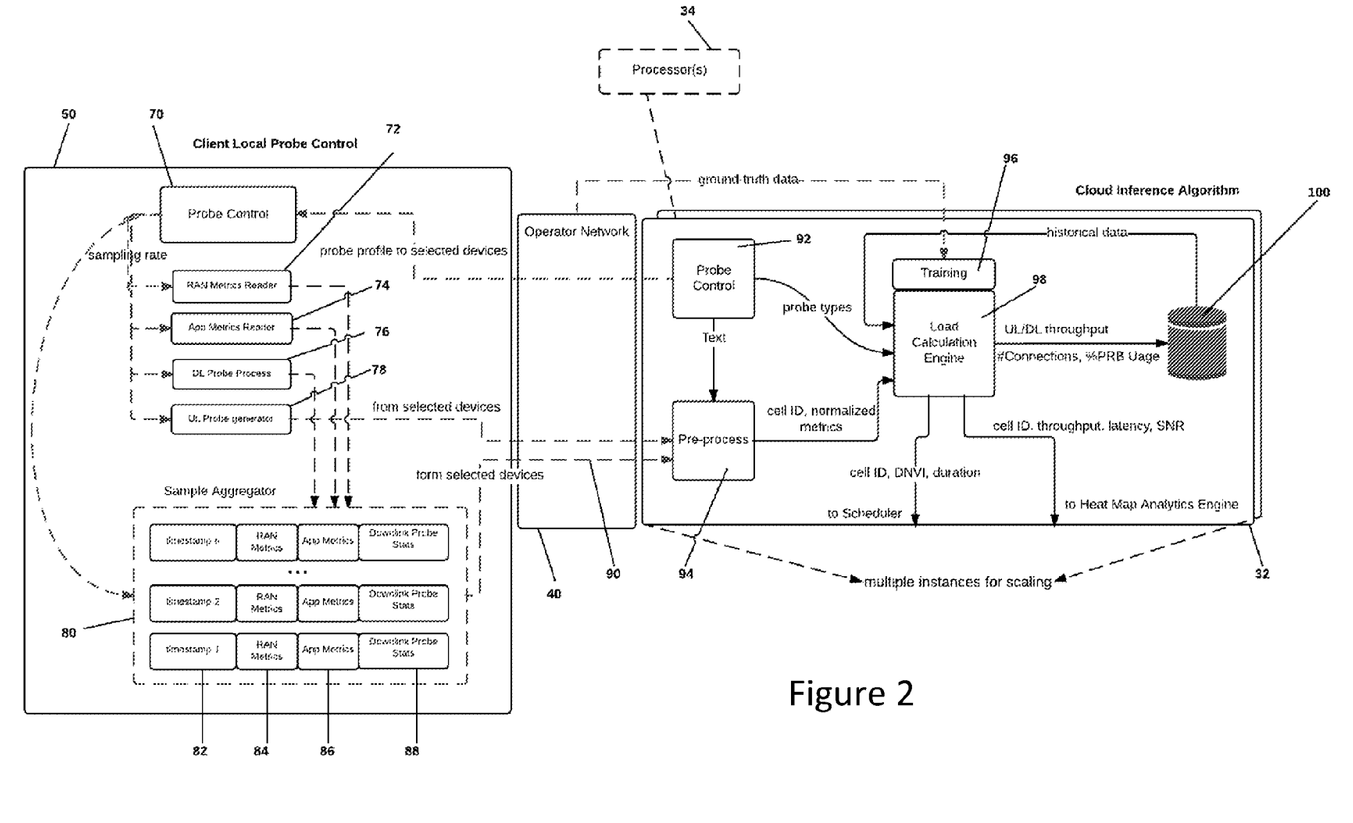
FIG. 2 is a block diagram showing additional detailed of the local probing control engine and the control server.

FIG. 2 is a block diagram showing additional detailed of the client probing control engine 50 (located in each client device) and the cell capacity engine 32 in the server 42. The client probing control engine 50 includes a client probe controller 70, a RAN metrics reader 72, an apps metrics reader 74, a DL probe processor 76 and UL probe generator 78, and measurement aggregation and sending function 80. The Radio Access Network (RAN) metrics reader 72 is configured by the client probe controller 70 to collect device type and remaining battery; RAN type, RAN signal strength (e.g. SNR, RSRP, RSCP) and signal quality (RSRQ, Ec/Io) and the cell ID, and the metrics collection interval.

The apps metrics reader 74 is configured by the client probe controller 70 to collect application average throughput, the round trip delay experienced by an application and the metrics collection interval. The DL probe process 76 is configured to receive the DL probe packets and record the packet delay, delay jitter and packet loss. The UL probe generator is configured to control the number of UL probe packet to send, the length of each packet and the interval between each packet and the frequency of UL probing based on the client probing profile. It should be understood that such profile information may be stored in the client probing profile or a separate UL probing profile without departing from the scope of this disclosure. The probe controller 70 has a default configuration, which enables collection and sending of only the RAN metrics within the first minute when an application integrated with DataMi SDK is launched or becomes active. As response to this RAN measurement packet, the server probe control 92 in the cloud sends a dynamic configuration (aka probing profile) specific to this mobile device to the client probe controller 70, including ON/OFF switch for each of the four types measurements, the interval of the measurements, the frequency to send the measurements to the cloud.

The outputs of the RAN metrics reader 72, apps metrics reader 74 and DL probe process 76 are coupled to an aggregator shown generally by reference number 80. The aggregator is configured to generate a single measurement packet. In this example, three measurement packets are shown. Each packet includes multiple measurement records depending on the metrics collection and sending interval specified in the client probing profile. In this example each measurement record includes a time stamp 82, RAN metrics 84, and/or app metrics 86 and/or DL probe measurements 88 depending on the ON/OFF flag configured for each individual measurements. The measurement packet is transmitted to the control server 32 via operator network 40 as generally shown by reference number 90.

When the UL probing is ON, the UL probes are generated with the number of configured packet, configured size and interval and sent to the control server 32 by UL probe generator 78.

The control server 32 is configured with a pre-processor 94, server probe controller 92, training controller 96 and load calculation engine 98. The pre-processor 94 is configured to receive and process the measurement packet and/or UL probing packets. The pre-processor 94 unpacks the time stamp 82, RAN metrics 84, app metrics 86 and DL probe measurements 88 from the received probe packets; normalizes the RAN, application and DL probe measurements; computes the mean, standard deviation; and removes the highly correlated measurements. For UL probe, the pre-processor 94 calculates the UL delay, delay jitter and packet loss. The server probe controller 92 is configured to rank all the active devices in a sector by their data usage for sending metrics measurements and/or UL probing, their remaining battery, their RF condition, and determine probing profile (configuration) for each device.

The client probing profile includes individual ON/OFF flag for RAN metrics measurement, app metrics measurement, DL probe metrics measurements, and UL probing; the metrics collection, or UL probing intervals if flag is ON and the interval for sending the metrics measurements. For example, the configuration may be set to collect RAN and application metrics only, once every minute and send one measurement packet every 15 minutes with 15-measurement records. The training controller 96 is configured to train inference algorithms offline using some or all four types of device measurements and the cell capacity usage (in terms of number of user, radio resource usage) measurements from an operator network. The algorithms will estimate the cell capacity usage in near future, such as in next 5, 10, 15 or 30 minutes. The load calculation engine 98 is configured to select and to run a load calculation algorithm based on the type of measurements a measurement packet contains. The algorithms are pre-trained neural network algorithms; they take the preprocessed device measurements and historical data as inputs and estimate the average number of users, cell UL/DL radio resource usage and UL/DL throughputs for the near future, and convert the estimates to the DNVI index. The load calculation engine 98 shares the results with scheduler 46 and heat map analytics engine 44. The load calculation engine 98 is also coupled to a database 100 configured to store historical information including the capacity usage estimates, DNVI and duration and the associated timestamp. The historical data is maintained for each cell (sector) of an operator network. The load calculation engine uses the historical data as algorithm inputs when real-time device measurements are not received frequently or when cell capacity usage forecast for a longer time period is required.

The control server is generally configured to optimize the network load. This step concerns with striking a desirable tradeoff among the accuracy of inference, robustness of availability, and reduction of probe size. It further distributes the probing loads among clients. Such distribution evens out the probing loads, e.g., instead of one client sends probing packets each of 500 bytes, the control server can coordinate 10 clients to each use probing packets of 50 bytes at appropriate times for uplink data paths, or send 50-byte probing packets on downlink data paths to the clients.

But such load balancing among clients does not have to distribute the probing loads completely evenly among the clients. For example, those clients with a low mobility and higher signal quality will be given a different profile than those with high mobility and lower signal quality.

The communication step from the control server to each client can be carried out at different frequencies. For example, a probing profile can be given to a client and be kept the same way, until and unless a new probing profile is computed and needs to be sent to the same client to replace the current probing profile.

The fusion step at the control server can take advantage of the multitude of measurement data reported from all the clients, across historical trends, and possibly discard measurement data from any subset of the clients.

The control server may also observe the number of available clients at a given sector at different times of the day, and leverage that trend to predict the upcoming possible changes in the probe profiles. Long-term adjustment of the optimization step and the fusion step can also be carried out based on the inference performance relative to some "ground truth" verified offline.

What is claimed is:

1. A data communication system configured to determine and coordinate loading in a mobile network having a plurality of client devices each configured with a processor, the system comprising:
   a control server configured with a processor coupled to a plurality of the client devices, the control server being equipped with a probe control function configured to transmit a downlink (DL) probe with an updated client probing profile to each client device;
   each client device processor being configured with a client probing control engine configured to gather network measurement information for transmission to the control server and generate uplink (UL) probes containing the network measurement information including, radio access network (RAN) metrics, DL probe measurements for transmission to the control server based on the client probing profile;
   wherein the control server is configured to receive the UL probes from the client devices and determine the system load based on the measurement information, the control server being configured to update client scheduling information based on the system load and transmit the client scheduling information to the plurality of client devices;
   wherein the load calculation engine is configured to calculate system load based on device measurements and historical data from the UL probes;
   wherein the load calculation engine includes pre-trained neural network algorithms that receive preprocessed device measurements and historical data as inputs and estimate the average number of users, cell UL/DL radio resource usage and UL/DL throughputs for the near future and a network load peak/valley indicator;
   wherein the load calculation engine is coupled to a database configured to store historical information including capacity usage estimates, network load peak/valley indicator and valley duration and an associated timestamp.

2. The system of claim 1 wherein each client device further comprises an adaptive upload/download client configured to upload or download application data during a system valley based on the client scheduling information.

3. The system of claim 1 wherein each client device further comprises a DL probe process configured to generate the DL probe measurements, the DL probe process being configured to receive DL probe packets from the control server and record the packet delay, delay jitter and packet loss.

4. The system of claim 1 wherein each client device further comprises an UL probe generator configured to control a number of UL probe packet to send, length of each packet, interval between each packet and a frequency of UL probing based on the client probing profile.

5. The system of claim 1 wherein each client device further comprises a default client probing profile with initial configuration information prior to receiving an updated client probing profile from the control server.

6. The system of claim 1 wherein each client device further comprises a Radio Access Network (RAN) metrics reader configured to collect the RAN metrics including, device type, remaining battery, RAN type, RAN signal strength, RAN signal quality and cell identification (ID).

7. The system of claim 1 wherein each client device further comprises an apps metrics reader configured to collect apps metrics including application average throughput and application round trip delay.

8. The system of claim 1 wherein each client device further comprises an aggregator configured to generate UL probes including a time stamp and RAN metrics.

9. The system of claim 1 wherein the aggregator is configured to generate UL probes including app metrics.

10. The system of claim 1 wherein the aggregator is configured to generate UL probes including DL probe measurements.

11. The system of claim 1 wherein the control server further comprises a pre-processor configured to receive the UL probes and unpack the time stamp and RAN metrics, app metrics and DL probe measurements.

12. The system of claim 11 wherein the pre-processor is configured to normalize the RAN, application and DL probe measurements, compute the mean and standard deviation and remove highly correlated measurements.

13. The system of claim 11 wherein the pre-processor is configured to receive the UL probes and calculates the UL delay, delay jitter and packet loss.

14. The system of claim 1 wherein the control server further comprises a load calculation engine is configured to select and to run a load calculation algorithm based on the UL probes.

15. A data communication system configured to determine and coordinate loading in a mobile network having a plurality of client devices each configured with a processor, the system comprising:
   a control server configured with a processor coupled to a plurality of the client devices, the control server being equipped with a probe control function configured to transmit a downlink (DL) probe with an updated client probing profile to each client device;
   a server probe controller configured to determine which of the plurality of mobile devices in a sector should send or receive probes and how often;
   each client device processor being configured with a client probing control engine configured to gather network measurement information for transmission to the control server and generate uplink (UL) probes containing the network measurement information including, radio access network (RAN) metrics, DL probe measurements for transmission to the control server based on the client probing profile;
   wherein the control server is configured to receive the UL probes from the client devices and determine the system load based on the measurement information, the control server being configured to update client scheduling information based on the system load and transmit the client scheduling information to the plurality of client devices;

wherein the server probe controller is configured to rank the mobile devices in a sector by data usage, remaining battery, RF condition, and determine the client probing profile for each device;

wherein the client probing profile includes individual ON/OFF flag for RAN metrics measurement, app metrics measurement, DL probe metrics measurements, and UL probing.

16. The system of claim 15 wherein each client device further comprises an adaptive upload/download client configured to upload or download application data during a system valley based on the client scheduling information.

17. The system of claim 15 wherein each client device further comprises a DL probe process configured to generate the DL probe measurements, the DL probe process being configured to receive DL probe packets from the control server and record the packet delay, delay jitter and packet loss.

18. The system of claim 15 wherein each client device further comprises an UL probe generator configured to control a number of UL probe packet to send, length of each packet, interval between each packet and a frequency of UL probing based on the client probing profile.

19. The system of claim 15 wherein each client device further comprises a default client probing profile with initial configuration information prior to receiving an updated client probing profile from the control server.

20. The system of claim 15 wherein each client device further comprises a Radio Access Network (RAN) metrics reader configured to collect the RAN metrics including, device type, remaining battery, RAN type, RAN signal strength, RAN signal quality and cell identification (ID).

21. The system of claim 15 wherein each client device further comprises an apps metrics reader configured to collect apps metrics including application average throughput and application round trip delay.

22. The system of claim 15 wherein each client device further comprises an aggregator configured to generate UL probes including a time stamp and RAN metrics.

23. The system of claim 15 wherein the aggregator is configured to generate UL probes including app metrics.

24. The system of claim 15 wherein the aggregator is configured to generate UL probes including DL probe measurements.

25. The system of claim 15 wherein the control server further comprises a pre-processor configured to receive the UL probes and unpack the time stamp and RAN metrics, app metrics and DL probe measurements.

26. The system of claim 15 wherein the pre-processor is configured to normalize the RAN, application and DL probe measurements, compute the mean and standard deviation and remove highly correlated measurements.

27. The system of claim 15 wherein the pre-processor is configured to receive the UL probes and calculates the UL delay, delay jitter and packet loss.

28. The system of claim 15 wherein the control server further comprises a load calculation engine is configured to select and to run a load calculation algorithm based on the UL probes.

* * * * *